United States Patent
Lukenich et al.

(10) Patent No.: US 6,448,726 B1
(45) Date of Patent: Sep. 10, 2002

(54) ELECTRONICALLY COMMUTATED MOTOR

(75) Inventors: Stefan Lukenich, Volkertshausen; Fritz Schmider, Hornberg, both of (DE)

(73) Assignee: Papst-Motoren GmbH & Co. KG, St. Georgen (DE)

(*) Notice: Subject to any disclaimer, the term of this patent is extended or adjusted under 35 U.S.C. 154(b) by 0 days.

(21) Appl. No.: 09/857,836

(22) PCT Filed: Nov. 26, 1999

(86) PCT No.: PCT/EP99/09171

§ 371 (c)(1),
(2), (4) Date: Jun. 8, 2001

(87) PCT Pub. No.: WO00/35074

PCT Pub. Date: Jun. 15, 2000

(30) Foreign Application Priority Data

Dec. 8, 1998 (DE) .................................... 298 21 770 U

(51) Int. Cl.[7] .............................................. H02K 23/00

(52) U.S. Cl. ...................... 318/254; 318/138; 318/439; 318/265

(58) Field of Search ................................ 318/138, 139, 318/245, 254, 439

(56) References Cited

U.S. PATENT DOCUMENTS

| | | | | | |
|---|---|---|---|---|---|
| 3,799,136 | A | * | 3/1974 | Korteling | 123/406.59 |
| 4,734,627 | A | * | 3/1988 | Koerner | 318/138 |
| 5,550,446 | A | * | 8/1996 | Schlager et al. | 318/138 |
| 6,051,944 | A | * | 4/2000 | Doemen | 318/254 |
| 6,307,338 | B1 | * | 10/2001 | Kuner et al. | 318/138 |
| 2001/0003412 | A1 | * | 6/2001 | Schmider et al. | 318/254 |
| 2001/0004194 | A1 | * | 6/2001 | Schmider et al. | 318/254 |

* cited by examiner

Primary Examiner—Karen Masih
(74) Attorney, Agent, or Firm—Gudrun E. Huckett

(57) ABSTRACT

An electronically commutated motor has a rotor and a stator interacting with one another. A semiconductor control member controls a motor current supplied to the stator. An arrangement is provided that detects values of the motor current which surpass a preset threshold value and generates a first signal upon surpassing the threshold value. An arrangement is provided that determines rotational speed values of the motor, which surpass a preset rotational speed, and generates a second signal upon surpassing the preset rotational speed. An arrangement is provided that combines the first and second signals for generating a combined signal, wherein the combined signal acts substantially without temporal delay on the semiconductor control member and reduces the motor current to a value which is greater than zero.

3 Claims, 2 Drawing Sheets

ELECTRONICALLY COMMUTATED MOTOR

BACKGROUND OF THE INVENTION

The invention relates to an electronically commutated motor. Numerous such motors are known.

For such motors it is desirable that they run with a low noise level during operation.

SUMMARY OF THE INVENTION

It is therefore an object of the invention to provide a novel electronically commutated motor.

According to the invention, this object is solved by a motor comprising an arrangement for detecting values of the motor current, which surpass a preset threshold value, and for generating a first signal upon surpassing this threshold value, further comprising an arrangement for determining rotational speed values, which surpass a preset rotational speed, and for generating a second signal upon surpassing the predetermined rotational speed, and comprising an arrangement for combining the first and second signals for generating a combined signal, which acts substantially without temporal delay on a semiconductor control member controlling the motor current and during its action reduces this motor current to a value which is greater than zero. Such a motor makes possible, on the one hand, a fast acceleration and, on the other hand, a smooth running at its operational rotational speed because, as a result of the current limitation that is active then, current peaks are effectively suppressed and this very efficiently lowers the noise level of such a motor.

BRIEF DESCRIPTION OF THE DRAWINGS

Further details and advantageous developments of the invention result from the embodiment described in the following and illustrated in the drawing, which embodiment is not to be understood in any way as a limitation of the invention. It is shown in.

DESCRIPTION OF THE PREFERRED EMBODIMENTS

Figure 1:
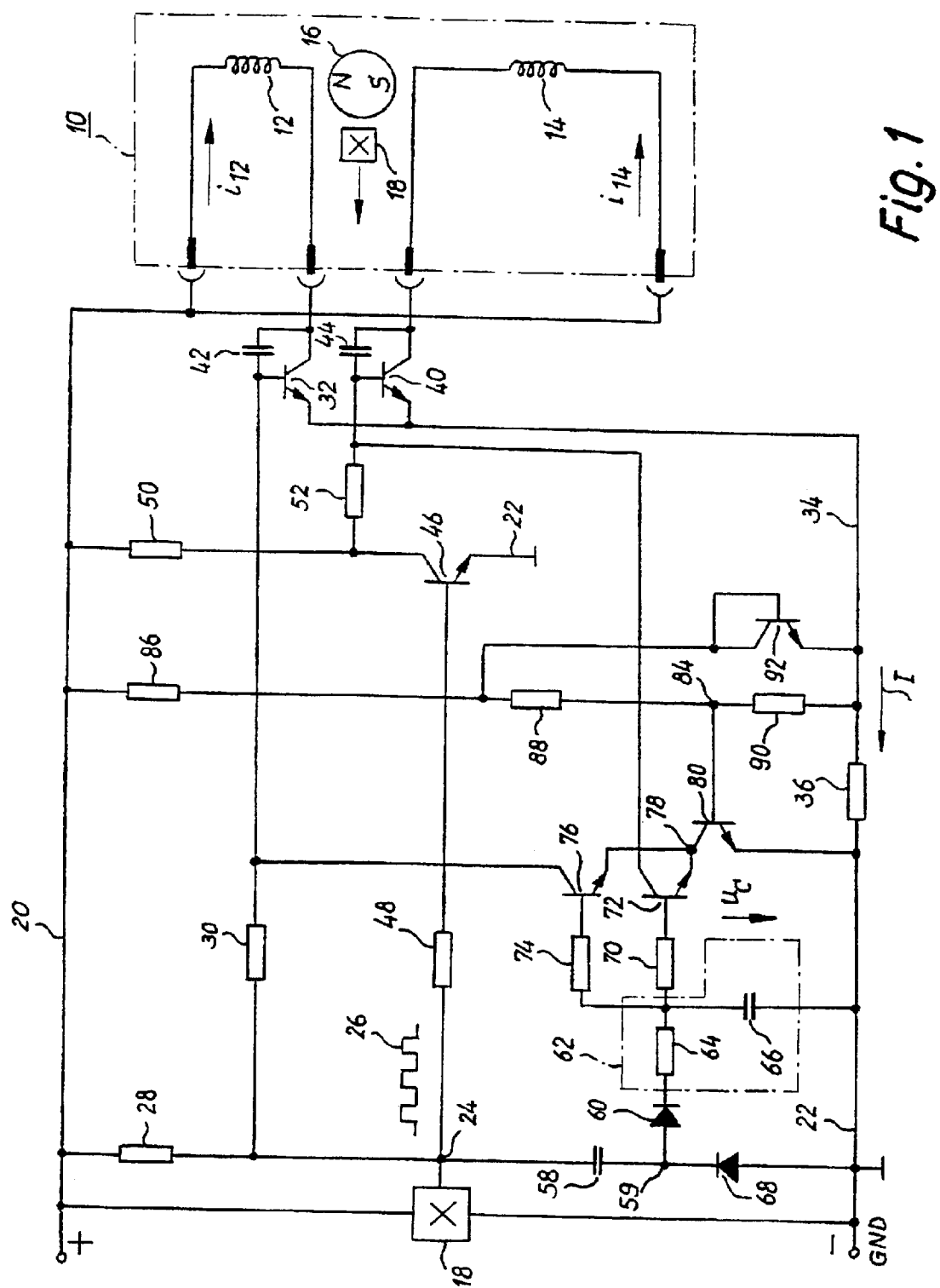
FIG. 1 a circuit diagram of a preferred embodiment of a motor according to the invention.

FIG. 1 shows schematically to the right a so-called two-pulse motor 10 with two stator winding phases 12 and 14 and a permanent-magnetic rotor 16 whose magnetic field controls a rotor position sensor 18 in the form of a Hall IC which is also illustrated in FIG. 1 all the way to the left and is connected with a positive line 20 and a negative line 22 between which a suitable direct-current voltage is supplied, for example, 12, 24 or 60 V. Rectangular pulses 26 with a frequency which is proportional to the rotational speed of the rotor 16 are supplied during operation to a terminal 24 of the Hall IC. The terminal 24 it is connected by a so-called pull-up resistor 28 to the pulse line 20.

The pulses 26 are supplied by a resistor 30 directly to the base of a npn transistor 32 which controls the current $i_{12}$ in the winding phase 12 whose one terminal is connected with the collector of the transistor 32 and whose other terminal is connected to the positive line 20. The emitter of the transistor 32 is connected with a line section 34 which is connected by a low-resistance measuring shunt 36 with the negative line 22. The measuring shunt 36 serves as a sensor member for the motor current I.

The other winding phase 14 is controlled by a npn transistor 40. For this purpose, one terminal is connected with the collector of the transistor 40, and the other connector is connected with the positive line 20. The emitter of the transistor 40 is connected with the line section 34.

Between collector and base of the transistor 32, a Miller capacitor 42 is arranged, and between the collector and the base of the transistor 40 a Miller capacitor 44 is arranged. When, for example, the transistor 32 is switched on, the Miller capacitor 42 slows the current increase, and when this transistor is switched off, the Miller capacitor 42 slows the current drop. The same holds true for the transistor 40. Accordingly, the motor noise during commutation is correspondingly reduced.

A npn phase reversal transistor 46 serves for controlling the transistor 40, wherein its emitter is connected with the negative line 22, its base is connected via the resistor 48 with the junction 24, and its collector is connected via resistor 50 with the positive line 20 and via resistor 52 with the base of the transistor 40.

When thus the potential at the junction 24 is high, the transistor 32 is switched on via the resistor 30 and the winding phase 12 is supplied with current while the winding phase 14 is current-less because the transistor 46 is conducting and thus blocks the transistor 40.

When, on the other hand, the potential at the junction 24 is low, the transistors 32 and 46 are blocked. Via the resistors 50 and 52 the base of the transistor 40 receives a current which switches on this transistor so that now the winding phase 14 is supplied with current.

The winding phases 12 and 14 obtain thus alternating current pulses, corresponding to the position of the rotor 16, as is known to a person skilled in the art. This is known as a two-pulse motor.

When a preset rotational speed is reached, the current is to be reduced in the winding phases 12, 14 so that the rotor 16 will not rotate too fast.

For this purpose, the rectangular pulses 26 are supplied via the capacitor 58, functioning as a differential member, a junction 59, and a first diode 60 to an integrator member 62 which comprises a resistor 64 and a capacitor 66; compare FIG. 1. A second diode 68 is arranged between the negative line 22 and the junction 59, and its cathode is connected to the junction 59.

With increasing rotational speed, the capacitor 66 is thus charged increasingly, i.e., the voltage $u_c$ thereat is a measure for the rotational speed of the rotor 16.

The voltage $u_c$ is supplied via a resistor 70 to the base of a npn transistor 72 and via a resistor 72 to the base of a npn transistor 76. The emitter of both transistors are connected to the junction 78, to which the collector of a npn transistor 8 is also connected, whose emitter is connected to the negative line 22.

The collector of the transistor 76 is connected with the base of the transistor 32 and the collector of the transistor 72 with the base of the transistor 40.

Accordingly, when the two transistors 76 and 80 are conducting, the base current of the transistor 32 is reduced so that the transistor 32 becomes less conductive.

When the transistors 72 and 80 are conductive, the base current of the transistor 40 is reduced so that it becomes less conductive.

The base of the transistor 80 is connected to a junction 84 which is preset to a certain potential by means of a voltage divider comprised of three resistors 86 (in the positive line 20), 88, and 90 (in the line section 34). For this purpose, a diode 92 is parallel connected to the resistors 88 and 90 in order to maintain the voltage at these two resistors constant. The diode 92, like the resistor 90, is also connected the line section 34.

As already described, between the line section 34 and the negative line 22 the measuring shunt 36 is provided through which the motor current I flows. The voltage at the resistor 90 is now selected such that it alone is not sufficient to make the transistor 80 conductive. However, once the current I increases past a predetermined value, a voltage drop occurs at the resistor 36 that, together with the voltage at the resistor 90, is sufficient in order to make the transistor 80 conductive, as needed for a current limitation.

However, as can be easily seen, the transistors 72, 76 must additionally also be conductive in order for a current limitation to take place. And these transistors 72, 76 become conductive only when the rotational speed and thus the voltage $u_c$ are high enough.

The current limitation thus is effective only when the motor has reached its preset rotational speed and thus has reached a preset voltage $u_c$.

When, upon reaching the operational rotational speed, the current I surpasses a certain threshold value $i_t$, the current I is limited to this value $i_t$ wherein the threshold value is a selected working point of the motor, which may correspond, for example, to the current I. This suppresses current peaks which would otherwise occur shortly before commutation, and a very constant course of the motor current I results, as illustrated in FIG. 2.

Figure 2:
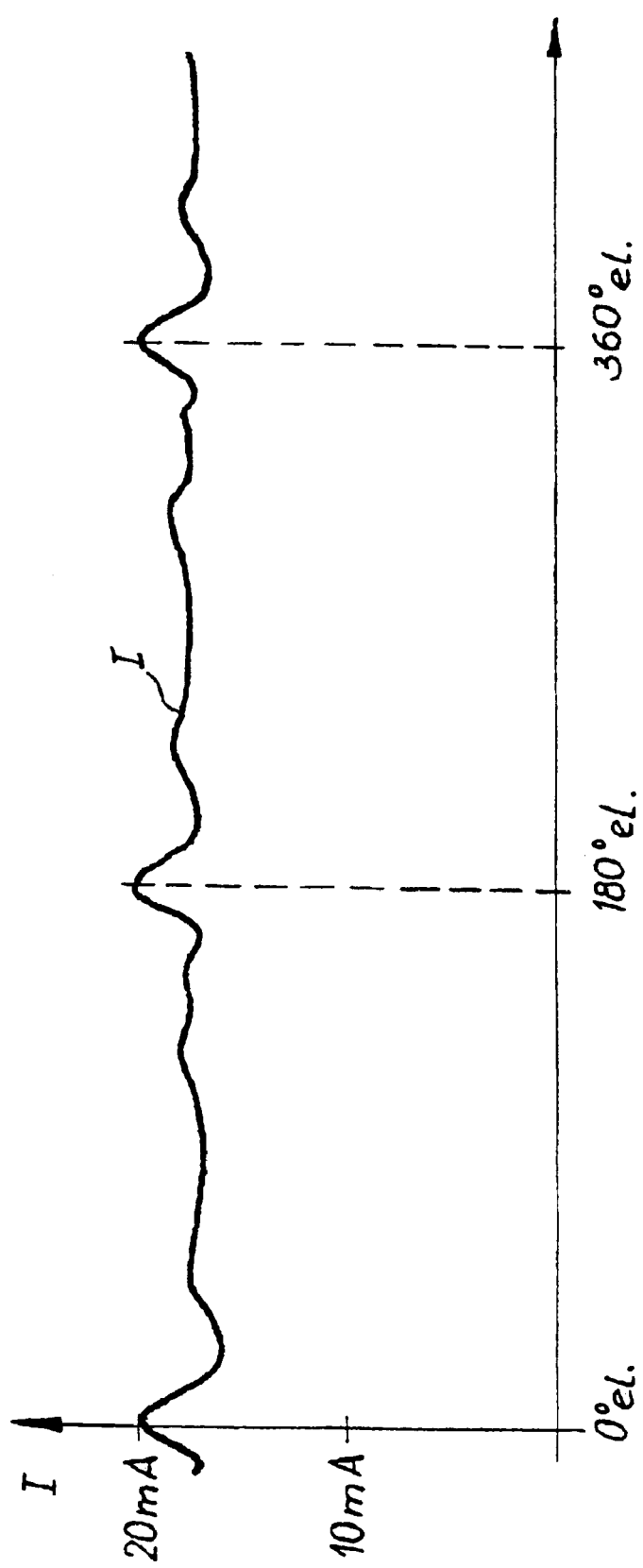
FIG. 2 a diagram illustrating the motor according to FIG. 1.

In FIG. 2, the commutation takes place at the rotor positions of 0 electrical degrees, 180 electrical degrees, 360 electrical degrees, and the current here increases only minimally because it is limited very quickly and effectively as a result of the transistor 80 becoming conductive. This results in a very strong reduction of the motor noise, which is advantageous particularly for small fans.

In principle, the present circuit thus operates when reaching the operational rotational speeds similar to a constant current member, i.e., the motor current will exhibit more the characteristics of a constant current.

Operational Mode

When starting the motor 10, the capacitor 66 is discharged and, therefore, the transistors 72 and 76 are blocked. By means of the rectangular signal 26, the transistors 32, 40 are alternately conductively controlled so that from approximately 0 electrical degrees to 180 electrical degrees the current $i_{12}$ and from approximately 180 electrical degrees to 360 electrical degrees the current $i_{14}$ flows, resulting also in the current peaks 100, 102 so that the motor will briefly become somewhat louder during starting.

When the operational rotational speed has been reached, the voltage $u_c$ becomes so high that the transistors 72 and 76 become conductive.

When the motor current I, for example, in the range of commutation, surpasses the threshold value $i_t$, the transistor 80 is conductive for a short period of time. When, for example, the transistor 32 receives at that moment a control current, so that the current $i_{12}$ flows, a part of this control current flows via the transistor 76 and 82 to the negative line 22, so that the current $i_{12}$ is reduced correspondingly. The same holds true for the transistor 40 and the current $i_{14}$.

When the rotational speed is too high, the threshold value $i_t$ is lowered, i.e., the current I is limited to a lower value.

In this way it is achieved that, during starting of the motor 10, the current I is not limited which results in a quick acceleration, that, however, upon reaching the desired rotational speed, current peaks will be suppressed in order to reduce the motor noise correspondingly, wherein this suppression simultaneously serves for limiting the rotational speed.

It has been found that in this way, especially in the case of motors for small fans, the motor noise can be greatly reduced. Accordingly, this represents a preferred application. Such a motor can, for example, have a power input of 0.5 W.

The following preferred parameters result for an embodiment (k=kOhm):

| | |
|---|---|
| operational voltage | 13 V (9 . . . 16 V) |
| Hall IC18 | Allegro UUA 1027BF |
| resistors 28, 30, 48, 50, 86 | 10 k |
| resistors 64, 70, 74 | 200 k |
| resistor 88 | 1 k |
| resistor 90 | 2.2 k |
| resistor 36 | 10 Ohm |
| diodes 60, 68 | BAS 216 |
| capacitor 58 | 10 nF |
| capacitor 66 | 100 nF |
| capacitors 42, 44 | 47 nF |
| transistors 72, 76, 80, 92 (transistor 92 is connected as a diode) | BC 847 C |
| transistors 32, 40 | BC 817-40 |

Of course, many variations and modifications are possible within the gist of the present invention.

What is claimed is:

1. An electronically commutated motor comprising:

a rotor (16) and a stator (12, 14) interacting with one another;

a semiconductor control member (32, 40) controlling a motor current (I, $i_{12}$, $i_{14}$) supplied to said stator (12, 14);

first means (36, 80, 90) for detecting values of said motor current (I, $i_{12}$, $i_{14}$) which surpass a preset threshold value ($i_t$), and for generating a first signal upon surpassing said threshold value;

second means (58 to 76) for determining rotational speed values of said motor, which surpass a preset rotational speed, and for generating a second signal upon surpassing said preset rotational speed;

third means (76, 72, 80) for combining said first and second signals for generating a combined signal, said combined signal acting substantially without temporal delay on said semiconductor control member (32, 40) and reducing said motor current to a value which is greater than zero.

2. The motor according to claim 1, wherein said stator has two winding phases (12, 14), wherein said semi-conductor control member comprises at least one transistor (32, 40), and wherein said motor current ($i_{12}$, $i_{14}$) is supplied to at least one of said winding phases (12, 14), wherein said at least one transistor (32, 40) controls said motor current ($i_{12}$, $i_{14}$) supplied to at least one of said winding phases (12, 14), and wherein said combined signal reduces a base current of said at least one transistor (32, 40).

3. The motor according to claim 2, further comprising at least one Miller capacitor (42, 44) connected to said at least one transistor (32, 40), respectively, and configured to reduce a speed of current change in said at least one transistor (42, 44) during commutation.

* * * * *